United States Patent [19]

Davis

[11] 4,196,429
[45] Apr. 1, 1980

[54] MOTION DETECTOR

[76] Inventor: Curtis H. Davis, 3333 Sand Point Rd., Fort Wayne, Ind. 46809

[21] Appl. No.: 854,522

[22] Filed: Nov. 25, 1977

[51] Int. Cl.$^2$ .................... G08B 21/00; G08B 13/02
[52] U.S. Cl. ........................ 340/669; 200/61.45 R; 340/65; 340/566; 340/571; 340/573; 340/576
[58] Field of Search ................. 340/566, 571, 573, 65, 340/575, 576, 683, 669; 200/DIG. 2, 8, 20, 29, 61.45 R, 61.52

[56] References Cited

U.S. PATENT DOCUMENTS

| | | | |
|---|---|---|---|
| 3,509,298 | 4/1970 | Kirk | 200/61.45 R |
| 3,539,740 | 11/1970 | Isenor et al. | 200/61.45 R |
| 3,742,478 | 6/1973 | Johnson | 200/61.45 R |
| 4,057,791 | 11/1977 | Bimmerle et al. | 340/571 |
| 4,110,741 | 8/1978 | Hubert et al. | 340/573 |

*Primary Examiner*—Glen R. Swann, III

*Attorney, Agent, or Firm*—Richard T. Seeger

[57] ABSTRACT

An array of interdigitally related elements are interstitially spaced from one another, with alternate elements in the array connected to a first conductor and the remaining elements in the array connected to a second conductor. A conductive member, such as a metallic ball, is freely movable in two dimensions over the area of the array, electrically coupling and decoupling adjacent elements in the array as it moves. A circuit is connected between the first and second conductors and detects the coupling of and/or decoupling of electrical contact between adjacent elements as the ball moves over the elements, with the frequency of the coupling and/or decoupling being detected to indicate a predetermined motion or absence of motion. The elements may take different configurations for different desired results.

9 Claims, 17 Drawing Figures

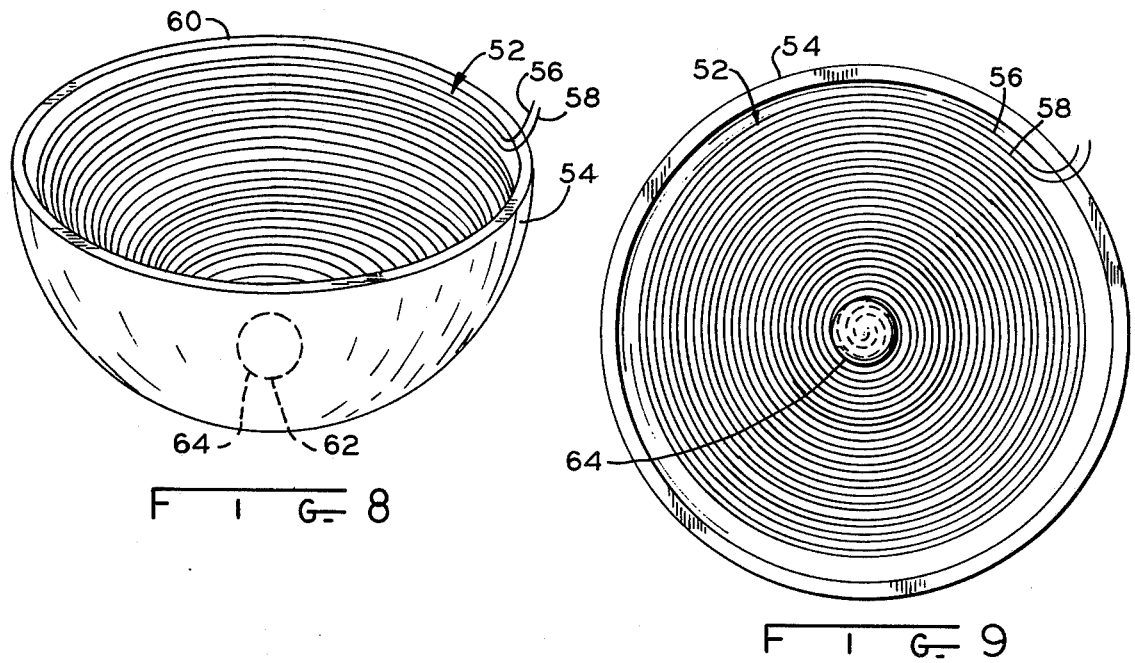
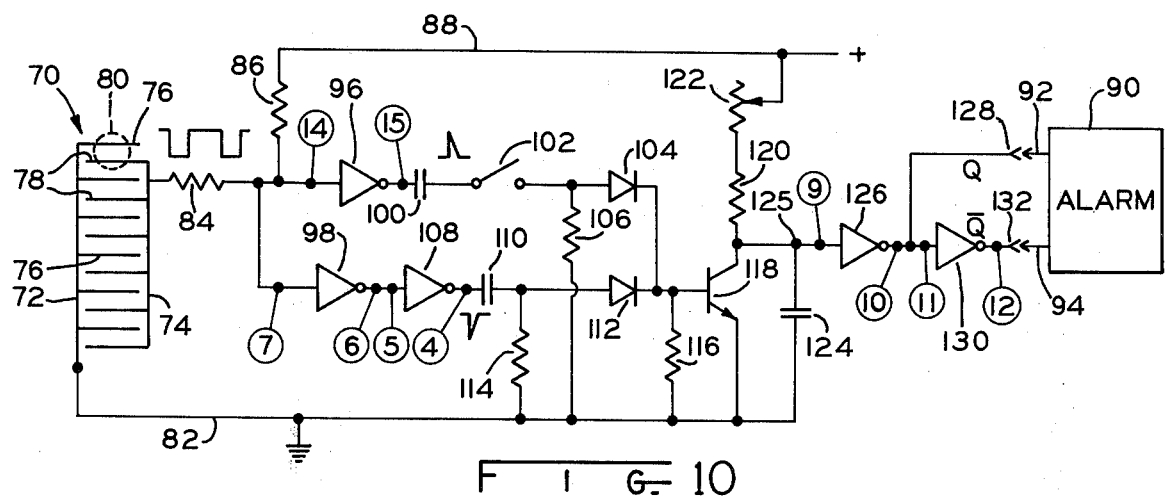
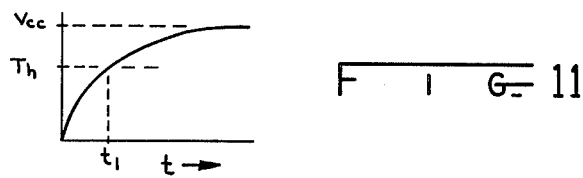
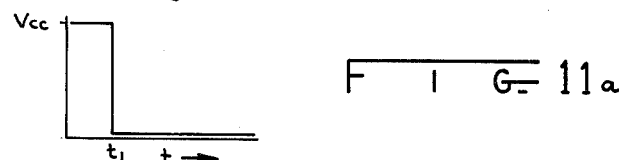
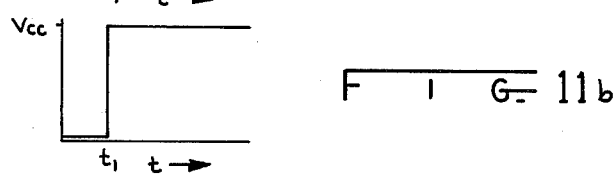

MOTION DETECTOR

BACKGROUND OF THE INVENTION

1. Field of the Invention

This invention is in the field of motion detectors and more particularly to those detectors utilizing the relative movement of a conductive member and contacts in a detector circuit.

2. Description of the Prior Art

Motion detectors have been used for many purposes for many years. In large part, these devices have been complex in structure, expensive in manufacture, required relatively frequent maintenance, were limited in direction and sensitivity of motion detection, and bulky in construction, all of which have limited their use to some degree. In one such prior system as illustrated in U.S. Pat. No. 3,163,856, a conductive member is movable in a prescribed circular path thus having only one dimensional movement relative to a plurality of contacts, alternate ones of the contacts being connected to a first conductor and the remaining contacts being connected to a second conductor. The operation and operability of the device in that patent is uncertain but in any event provides detection for only movement of the conductive member in a predetermined track. Certain of the prior art is exemplified in the following U.S. patents: U.S. Pat. Nos. 2,848,712; 2,889,422; 2,898,416; 3,108,252; 3,163,856; 3,372,253; 3,629,748; 3,729,602; 4,042,796; 4,039,789.

SUMMARY OF THE INVENTION

This invention has a plurality of filamentar conductive elements interstitially spaced in side by side relation in an array over a predetermined area. A metallic ball is freely movable over the area in two dimensions but is confined in a direction normal to the surface of the area so that the ball is freely rollable over the area, but excessive movement of the ball in a direction normal to the area is effectively constrained.

The element dimensions, the interstitial spacing between the elements, and the diameter of the ball are selected so that movement of the ball over the elements will cause successive electrical coupling and decoupling between successive adjacent elements. Thus, a contact is first made between the first two adjacent elements as the ball is momentarily positioned between those elements, that coupling being decoupled as the ball continues rolling, a coupling being established between the element over which the ball rolls and the next adjacent element. As mentioned, the ball is free to roll in any direction on the two dimensional array. By conforming each of the elements in a stepped relation, or in an oblique relation to the axis of the curvilinear surface on which array is placed, while maintaining the interstitial spacing, smaller increments in all directions on the two dimensional area are detectable.

Alternate elements are connected to a first conductor and the remaining elements are connected to a second conductor, with the elements of one conductor being insulated from the elements of the other conductor. The ends of the first and second conductors are coupled to a detection circuit for measuring the occurrence and frequency of electrical coupling and decoupling between adjacent elements; the circuit being sensitive to each electrical coupling between adjacent elements and each electrical decoupling between adjacent elements. Further, a switch is provided for measuring only the decoupling occurrences, thus providing a movement sensitivity adjustment. Still further, terminals are provided for measuring the motion or absence of motion, depending on the application of the invention.

The array area may be provided on the inner periphery of a cylinder, on a flat surface, on the inner surface of a hemisphere, on a surface of any other predetermined configuration. By placing the array on a curvilinear surface, the conductive member will seek the lowest point making motion detection more positive. Also, detector will operate in a wider variety of mounting positions due to the curvilinear two-dimensional array. The invention may be placed in an automobile to detect any unauthorized motion thereof and thus set off an alarm to warn away attempts at theft or vandalism; may be placed on a tarpaulin covering merchandise in a warehouse or at dockside so that any disturbance of the cover would likewise cause an alarm; may be placed on the steering wheel of a vehicle to detect any absence of motion over a predetermined time to set off an alarm for driver alertness; or may be placed on the helmet of an emergency worker to detect any absence of motion and disablement of the worker. Other applications will be apparent to those skilled in the art.

This invention may utilize filamentar elements arranged in interdigital fashion with a relatively small metallic ball used as the conductive member and the detection circuitry used may be a commercially available hex-inverter. Thus, the total size of the unit is relatively small making it available for use in a wide range of applications where size, weight, and noticeability are factors. Further, the detector will operate over a wide range of supply voltages, which is important for battery operated applications.

In this description, the term "interdigital" will be used to define a plurality of relatively fine interstitially spaced elongated conductive elements. Alternate elements are connected to a first conductor and the remaining elements being connected to a second conductor with the elements of one conductor being electrically insulated from the elements of the other conductor.

It is therefore an object of this invention to provide a motion detector which is relatively small in weight and size, inexpensive in manufacture and maintenance, and durable and reliable in use.

Another object of this invention is to provide in the detector of the aforementioned object, motion detection of a conductive member over a two dimensional area.

A still further object of this invention is to provide a detector of the foregoing objects that utilizes the motion of a conductive element in electrically coupling and decoupling the elements in an interdigital circuit, with a circuit capable of selectively detecting only one of the coupling and decoupling occurrences between the elements, thereby providing a detector having substantially one half the sensitivity.

Another object is to provide a detector of the foregoing objects that is capable of operating in a large range of mounting orientations.

A further object is to provide a detector of the foregoing objects that is capable of operating over a wide range of supply voltages and component values.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 8 is a view in perspective of a further embodiment of this invention wherein the array area is hemispherical;

FIG. 9 is a top plan view of the embodiment of FIG. 8;

FIG. 10 is a schematic view of the sensing circuitry used with the embodiments of this invention;

FIG. 11 is a plot of the waveform at the output of the charging network of the circuit in FIG. 10;

FIG. 11a is a plot of the waveform at one output of the circuit of FIG. 10 in time relation to the output described in FIG. 11;

FIG. 11b is a plot of the waveform at other output of the circuit of FIG. 10 in time relation to the output described in FIG. 11;

DESCRIPTION OF THE PREFERRED EMBODIMENT

Figure 1:
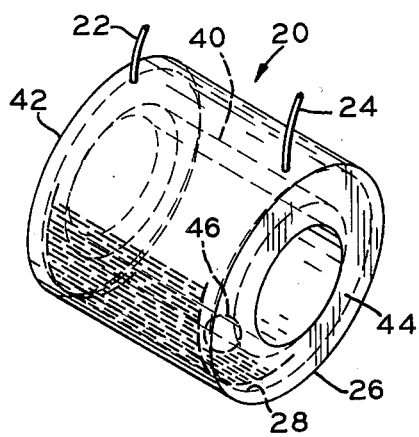
FIG. 1 is a view in perspective of a first embodiment of this invention.
Figure 2:
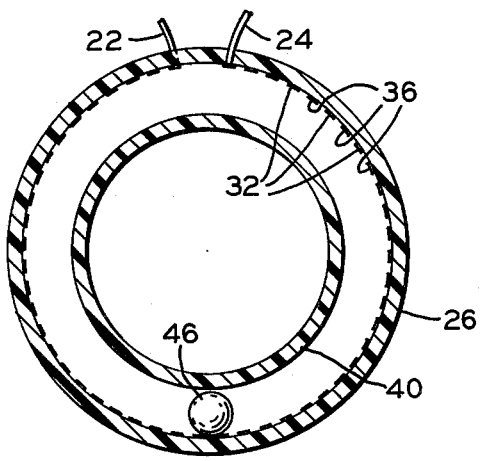
FIG. 2 is an end view of the embodiment of FIG. 1.
Figure 3:
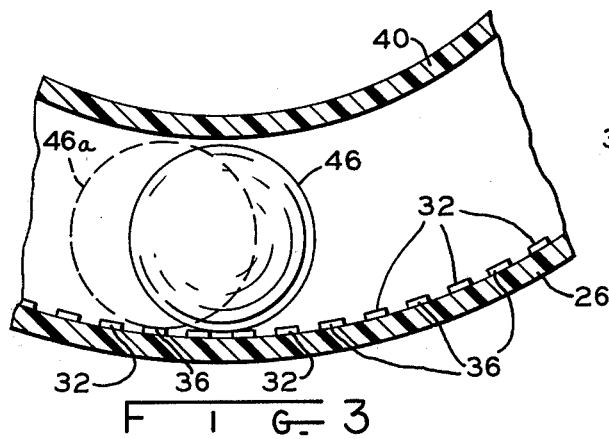
FIG. 3 is an enlarged view showing the conductive member forming a coupling between two adjacent elements and in dashed lines wherein it is in a position of decouplement of adjacent elements.
Figure 4:
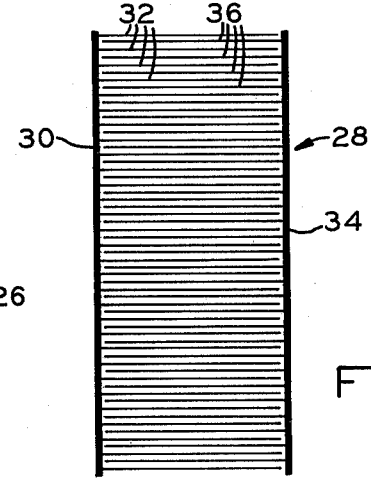
FIG. 4 is a developed top plan view of the interdigital circuitry of the embodiment of FIG. 1.

Referring to FIGS. 1 to 4, a mechanical motion sensor 20 is connected at leads 22 to 24 to a motion detector circuit, later described, and has an outer cylindrical wall 26. An interdigital array 28 is affixed to the inner surface of wall 26 and is dimensioned to substantially cover the inner surface of wall 26. "Interdigital array" as used in this description defines a first common conductor 30 having a plurality of elements 32 extending therefrom in comb-like fashion and a second common conductor 34 having elements 36 extending therefrom in comb-like fashion. The spacing between elements 32 is substantially equal to the spacing between elements 36, with elements 32 and 36 being interfitted and interstitially spaced in non-contacting relationship to one another. For example, in this embodiment, elements 32, 36 may be filamentar conductors having a width of approximately twenty mils and a thickness or height of approximately three mils and the spacing therebetween may be approximately twenty mils. Preferably, elements 32, 36 are gold plated to resist oxidation and may be molded in insulative plastic material to maintain the spacing between adjacent elements. Alternate elements 32 are connected to common conductor 30 and the remaining elements 36 are electrically coupled to conductor 34.

Leads 22 and 24 are electrically coupled respectively to conductors 30, 34.

An inner cylindrical wall 40 is positioned within and concentric with wall 26, with cylinder ends 42, 44 being affixed to the respective ends of walls 26, 40. Walls 26, 40, and ends 42, 44 are of an electrically insulative material such as plastic.

A conductive member, such as metallic ball 46 which in this embodiment may have a diameter of 100 mils, is placed between walls 26, 40 prior to the assembly of ends 42 and 44, and ball 46 may also be gold plated to improve electrical conductivity and minimize oxidation. Ball 46 has a diameter slightly less than the radial spacing between walls 26, 40 so that it is rollably movable over the cylindrical two-dimensional array 28. Thus, inner wall 40 serves to confine ball 46 to two dimensional movement over the area of array 28 for accurate and reliable motion indication. Further, ball 46 has a diameter relative the spacing between elements 32, 36 to electrically couple adjacent elements 32, 36, FIG. 3, and effect a decoupling upon a rolling movement, shown by the dashed line position 46a, wherein it is electrically coupled only with an element 32. As will be explained later in conjunction with the circuit diagram of FIG. 10, this coupling and decoupling is instrumental in the actuation of an alarm. Thus, ball 46 is free to roll in any direction over the area of the two dimensional array 28, coupling and decoupling adjacent elements 32, 36 as it rolls, and because of the two-dimensional area provided by array 28, ball 46 will effect such coupling and decoupling for substantially any movement in any of these dimensions of sensor 20.

Figure 5:
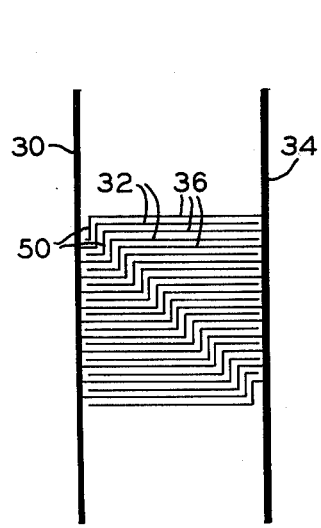
FIGS. 5 to 7 are developed views of alternative embodiments of the interdigital circuitry shown in FIG. 4.
Figure 6:
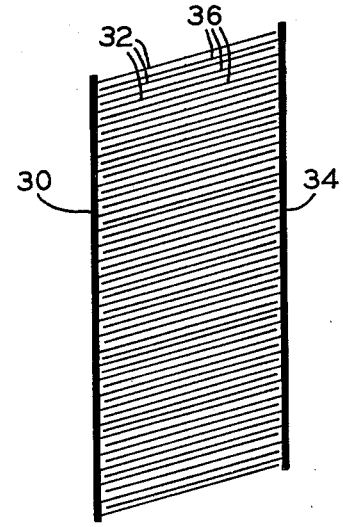
Figure 7:
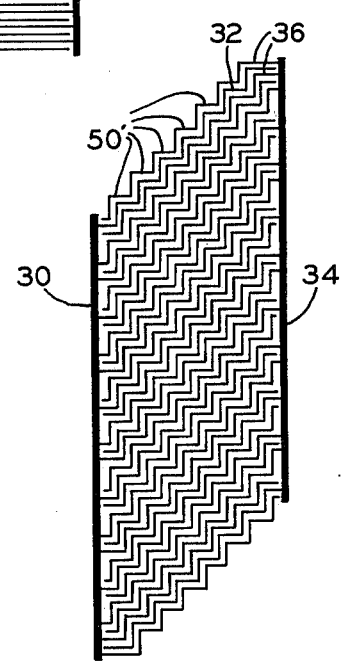

Detection of movement of sensor 20 in any of three directions is improved by placing a step 50, FIG. 5, in each of the elements 32, 36, maintaining their interstitial spacing. Placing several steps 50 in each element 32, 36, FIG. 7, while maintaining the interstitial spacing further improves detection of motion in any of three dimensions of the sensor 20. A still further embodiment, FIG. 6, wherein the elements 32, 36 are obliquely coupled to conductors 30, 34 respectively, with the interstitial spacing being maintained, also improves detection of motion in any of three dimensions of sensor 20.

Referring to FIGS. 8 and 9, a further embodiment is shown wherein the two dimensional interdigital array 52 is shaped in the form of a hemisphere. An outer insulative hemispherical shell 54, which may be of an insulative material such as plastic, supports a spirally wound pair of conductors 56, 58 which are interstitially spaced and are spirally wound from the upper circumference 60 of shell 54 to the lowest or nadir point 62 of shell 54, with the spacing between conductors 56, 58 being maintained and with the ends of conductors 56, 58 being at point 62 on shell 54 and being spacedly insulated from one another. The size, spacing, material, plating, and affixation of conductors 56, 58 may be comparable to that for elements 32, 36. A conductive member such as metallic ball 64 is placed on the two dimensional hemispherical array 52 with the rolling movement of ball 64 over array 52 causing electrical coupling and decoupling between conductors 56, 58, in the manner of ball 46 and elements 32, 36. The diametrical dimension of ball 64 relative the spacing between conductors 56, 58 is comparable to that of ball 46 relative to the spacing between elements 32, 36, to provide comparable coupling and decoupling action as the ball rolls over its respective array area.

With the embodiment shown in FIGS. 8 and 9, movement of shell 54 in substantially any of three dimensions will cause a rolling of ball 64 and sequential coupling and decoupling between conductors 56, 58. It is to be understood that a complete sphere which may be comprised of two shells 54, the open ends of which are placed one against the other, to measure movement regardless of the sphere attitude. Further, it is to be understood that a second smaller shell of insulative material may be placed and supported within shell 54 and radially spaced therefrom a distance slightly greater than the diameter of ball 64 to provide rolling confinement of ball 64 against the area surface of array 52. This would be especially important when the aforementioned spherical embodiment is utilized to prevent bouncing of ball 64 from one point on array 52 to a second and subsequent points spaced therefrom.

A circuit is provided for processing the occurrence of the coupling and decoupling between elements 32, 36 and conductors 56, 58 to generate an alarm upon such occurrence or non-occurrence in a given time period. Referring to FIG. 10, an interdigital array 70 has common conductors 72, 74 with interdigital elements 76, 78 electrically coupled thereto, respectively. A conductive ball 80 is shown in dashed lines to schematically represent the interdigital circuits previously described. Conductor 72 is electrically coupled to ground line 82 while conductor 74 is coupled through resistances 84 and 86 to voltage supply line 88 to which is applied a plus voltage of five to fifteen volts. It is an advantage of this circuit that a relatively wide range of supply voltage may be used to operate the circuit. This is important in those applications wherein a portable battery is required over relatively long periods of time. The circuit shown in FIG. 10 incorporates a circuit commonly known as a "hex inverter" buffer amplifier circuit and is commercially available from a number of manufacturers, one being RCA and having part no. RCA CD 4049BE, and has pin connections to componentry, array 70, and an alarm circuit 90, which may be any circuit for providing a visual, audible, or other alarm upon a given voltage level being applied to either of its input terminals 92, 94. The pin numbers of the inverter are encircled and have lead lines to the pin connections to external components, which are indicated by dots. Since hex inverters are available in integrated circuit chips, the cost and size of the motion detector is substantially reduced. Only five of the six inverters are used and pin 1 is connected to Vcc supply voltage, pin 8 to ground, and pins 2, 3, 13 and 16 are unused.

Resistance 84 couples conductor 74 to the inputs of inverting amplifiers 96, 98, amplifier 96 being coupled at its output through capacitor 100 and switch 102 to the anode of diode 104 and through resistance 106 to ground line 82. The output of amplifier 98 is coupled to the input of inverting amplifier 108 with its output being coupled through capacitor 110 to the anode of diode 112 and through resistor 114 to ground line 82. The cathodes of diodes 104, 112 are connected through resistance 116 to ground line 82 and coupled to the base of transistor 118, which has its emitter coupled to ground line 82 and its collector connected through resistance 120 and potentiometer 122 to power supply line 88.

The afore-referenced hex inverting buffer amplifiers have characteristics similar to Complimentary Metal Oxide Silicon (CMOS) transistor and gates with all inputs coupled together. The output of each inverter 96, 98, 108, 126, and 130 goes to a predetermined level upon the application of a threshold voltage to their inputs. Other circuits having similar functions could be used. These devices normally have either a "high" or a "low" output which output switches within a narrow range of input threshold voltages. A CMOS hex inverter circuit has the advantage of exceptionally low power use.

The state of charge, or voltage, on capacitor 124 determines the output states at 128 and 132 by means of the input threshold voltage of inverter 126. Assuming that transistor 118 is in an "off" state, capacitor 124 will charge at a time constant determined by resistors 120 and 122 and capacitor 124 in the relationship $T = KRC$ where $T$ = time, $K$ = a constant, $R$ = resistance of resistor 120 and potentiometer 122, and $C$ = capacitance of capacitor 124. Minimum time constant is obtained when potentiometer 122 is set at a minimum and maximum time constant when potentiometer 122 is set at maximum value. FIG. 11$a$ shows the output of inverter 126 and FIG. 11$b$ shows the output of inverter 130, which are the voltages respectively at terminals 128, 132, upon application of a threshold voltage Th at their inputs. Sensitivity is determined by spatial relationship of the ball and the conductor width and separation.

The collector of transistor 118 is coupled through capacitor 124 to ground line 82 and coupled to the input of inverting amplifier 126, having its output coupled to output terminal 128 and to the input of inverting amplifier 130, which has its output connected to output terminal 132. Terminals 128 and 132 are coupled respectively to alarm input terminals 92, 94.

In operation of the circuit of FIG. 10, assuming ball 80 is coupling adjacent elements 76, 78 in array 70, an electrical connection is made between conductors 72 and 74, completing a connection through resistances 86, 84 between voltages supply line 88 and ground line 82. This lowers the voltage at the inputs of inverters 96, 98 causing a corresponding amplified positive voltage at their outputs. Assuming switch 102 is closed, a positive spike will be developed across capacitor 100 the period of which is controlled by the values of capacitor 100 and resistance 106. This causes diode 104 to conduct placing a positive voltage at the base of transistor 118 causing it to conduct and to discharge capacitor 124, sharply dropping the voltage at the input to inverter 126. This causes a sharp increase in the voltage at the output of inverter 126, and terminal 128, and the input to inverter 130 and a sharp decrease in the voltage at the output of inverter 130 and terminal 132.

The occurrence of a coupling between adjacent elements 76, 78, causes a negative pulse applied to the input of inverter 98, as previously explained, resulting in an amplified positive pulse at its output and input to inverter 108 and an amplified negative pulse at its output, which causes a negative spike across capacitor 110 which is blocked by anode 112. Therefore, on a coupling between adjacent elements 76, 78, a positive pulse is applied to the base of transistor 118 only through diode 104, and then only when switch 102 is closed.

On a decoupling between adjacent elements 76, 78, the common conductors 72, 74 are decoupled, causing a substantially instantaneous rise in voltage at the inputs of inverters 96, 98. On such an occurrence, the voltage at the output of inverter 96 correspondingly drops, with a negative current spike being developed across capacitor 100, which is blocked by diode 104, assuming switch 102 is closed. However, on a positive pulse to the input of inverter 98, an amplified negative pulse is at its output and the input of inverter 108 causing a positive pulse at its output and a positive spike across capacitor 110, which is shaped by the values of capacitor 110 and resistor 114, causing diode 112 to conduct and applying a positive pulse to the base of transistor 118 causing discharge of capacitor 124 and causing a positive pulse at terminal 128 and a negative pulse at terminal 132 as previously described.

Thus, assuming switch 102 is closed, on each coupling or decoupling between adjacent elements 76, 78, a positive voltage is applied to terminal 128 and a negative voltage is applied to terminal 132. However, when switch 102 is open, output signals are applied at terminals 128, 132 only when a decoupling occurs between adjacent elements 76, 78, thus reducing by approximately one half the sensitivity of the detector since ball 80 must roll in a given direction over twice as many elements in order to get an output signal.

Thus, if the coupling and/or decoupling of adjacent elements 76, 78 is made at a frequency having a time period less than the adjustable time constant of resistor 120, potentiometer 122 and capacitor 124, the capacitor 124 voltage will not exceed the threshold voltage of inverter amplifier 126, and there will be no change in outputs 128, 132. If, on the other hand, the frequency of coupling and/or decoupling is low, the RC time constant will provide a charge voltage on capacitor 124 that exceeds the threshold voltage of inverter 126 and outputs 128, 132 will switch to the alternate state. If the charge voltage of capacitor 124 has exceeded the threshold voltage of inverter 126, then upon the next coupling or decoupling of elements 76, 78, assuming switch 102 is closed, transistor 118 will saturate, discharging capacitor 124 and switching the outputs 128, 132.

A further advantage of this circuit is that it can detect absence of motion as well as motion. For example assume that ball 80 is stationary in either a coupling or decoupling position, the charge on capacitor 124 will continue to build, at a rate depending upon the values of capacitance 124, resistances 120, and the setting of potentiometer 122, building the voltage at the input of inverter 126 and causing a corresponding increase in voltage at terminal 132. As will become apparent, for both modes of operation, as a "motion detector" or "absence of motion detector," adjustment of potentiometer 122 will act as a manual adjustment for the period of time in the "absence of motion" mode or the degree of movement in the "motion" mode, that will cause circuit 90 to generate an alarm.

Figure 12:
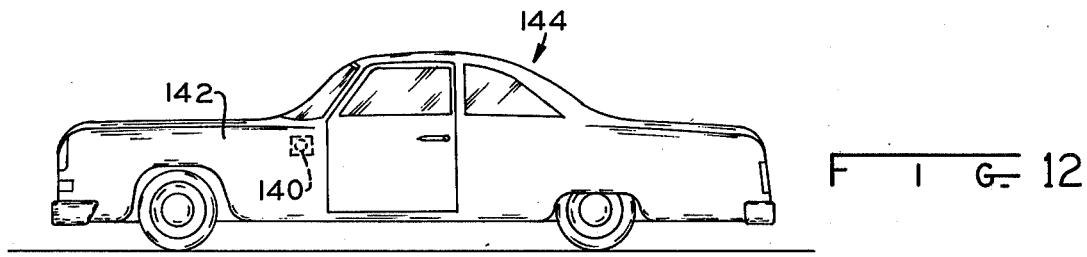
FIG. 12 is a side elevational view of an automobile having an embodiment of this invention incorporated therein.

Referring to FIG. 12, a motion detector 140 is shown schematically attached to the inner surface of a vehicle panel 142 of an automobile 144 which may place it interiorly of the vehicle. Detector 140 may be completely self contained having the mechanical sensor, detector circuitry, and alarm in one relatively small package, with the alarm being set to detect motion so that if vehicle 144 is moved in any direction, such as raising of the bumper to remove a wheel, the vibration of impact associated with the opening or closing of a vehicle door or trunk lid, or movement of the vehicle itself, an alarm will be sounded or otherwise generated.

Figure 13:
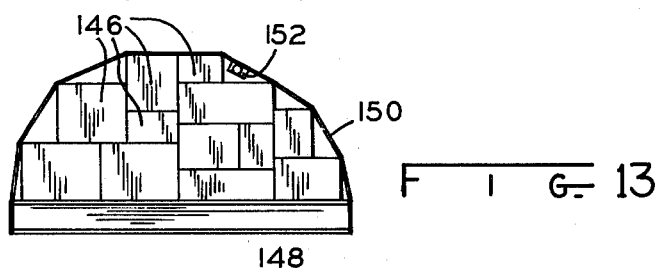
FIG. 13 is a side elevational view of covered freight containers having an embodiment of this invention attached to the cover.

Another application of this invention is shown in FIG. 13 wherein a plurality of freight boxes 146 are shown stacked on a pallet 148 as they would be at a warehouse, loading dock, or other storage facility, with tarpaulin 150 being fastened thereover. A motion detector 152 is attached to the inner surface of the tarpaulin, hidden from view, and any movement of the tarpaulin which may be caused by lifting in order to obtain access to boxes 146, or even the removal of a bungee cord which would cause a slight movement of tarpaulin 150, would cause detector 152, which also has a mechanical sensor, electrical circuitry, and alarm system self contained therein, to sound or otherwise generate an alarm signal.

Figure 14:
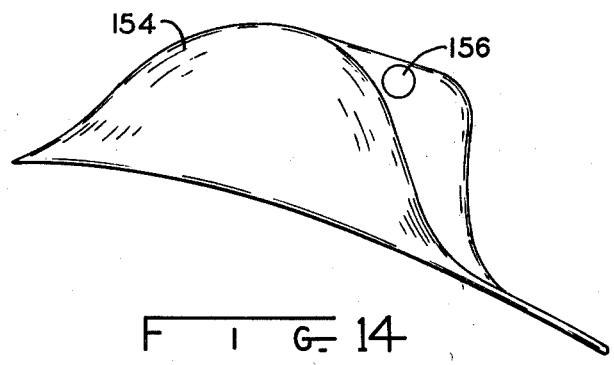
FIG. 14 is a side elevational view of a helmet having an embodiment of this invention attached thereto.

A further application of this invention is shown in FIG. 14 wherein a helmet 154, which may be used by an emergency worker such as a fireman or other worker in a dangerous environment, has a motion detector 156 again which has a mechanical sensor, electrical circuitry, and alarm system self contained therein, attached thereto and in this application, the alarm will sound or be otherwise given in an absence of motion for a predetermined time, indicating the disablement of the worker.

Figure 15:
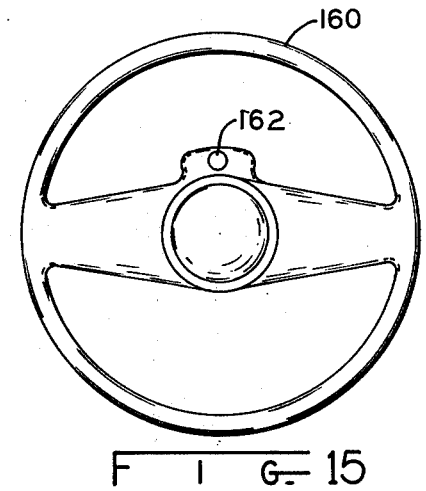
FIG. 15 is a front elevational view of a vehicle steering wheel having an embodiment of this invention attached thereto.

A further application of this invention is shown in FIG. 15 wherein a vehicle steering wheel 160 has attached thereto a motion detector 162, which may be self contained as previously explained for the other motion detectors or used in conjunction with additional circuitry, alarms, and controls, and which is connected to indicate absence of motion over a predetermined time for sounding an alarm or otherwise generating an alarm or control signal. It has been found that if a steering wheel is not moved or adjusted within a predetermined time period, lack of driver alertness is indicated. By properly choosing or adjusting the time period, an alarm will sound or be otherwise generated to alert the driver to the portending dangerous situation before the vehicle becomes involved in a dangerous, inextricable, situation.

The values of circuit components of a satisfactory working embodiment are as follows:

| Resistances: | |
| --- | --- |
| Ref. No. | Value (Ohms) |
| 84 | 10K |
| 86 | 1 meg. |
| 106 | 100K |
| 114 | 100K |
| 116 | 100K |
| 120 | 100K |
| 122 | 1 meg. |
| Capacitances: | |
| Ref. No. | Value (Microfarads) |
| 100 | .1 |
| 110 | .1 |
| 124 | 10 |

While the circuit of FIG. 10 uses an NPN transistor with emitter connected to ground, it is possible to duplicate the circuit function by reversing the diode polarities and using a PNP transistor with emitter connected to positive supply line. Diodes 104 and 112 are IN4454 and transistor 118 is a 2N5089.

Also, the width of the interdigital elements may be varied to adjust sensitivity of the detector. The wider the elements, the longer travel of the conductive member across the elements is required to effect a coupling or decoupling between the elements. Also, the elements may be selectively widened for desired applications. In addition, certain of the elements may be provided with a dielectric coating to further adjust the sensitivity of the detector since the conductive member could not effect a coupling or decoupling signal between an insulated element and an adjacent element. In addition, buffers may be provided between the circuit output and the alarm system to provide sufficient power drive for any desired alarm regardless of the power required to drive the alarm.

While there have been described above the principles of this invention in connection with specific apparatus, it is to be clearly understood that this description is made only by way of example and not as a limitation to the scope of the invention.

What is claimed is:

1. A motion detector comprising;
   a detector housing;
   first means for generating a signal upon a predetermined movement of said housing;
   second means coupled to said first means for processing said signal to provide a first signal upon a predetermined housing movement in a predetermined time period and a second signal upon an absence of housing movement during a predetermined time period;
   third means coupled to said second means for generating an alarm in response to a selectable one of said first and second signals.

2. A motion detector circuit comprising;
   a voltage supply;
   a ground
   an interdigital circuit having first and second common conductors;
   an integrated hex inverter circuit having first, second, third, fourth, and fifth inverters each having an input and output;
   said first common conductor being coupled to the inputs of said first and second inverters;
   said first inverter having an output being capacitor coupled to the input of a first diode;
   said second inverter having an output being coupled to the input of said third inverter;
   said third inverter having an output capacitor coupled to the input of a second diode; the outputs of said first and second diodes being coupled to the base of a transistor; the collector of said transistor being resistively coupled to said voltage supply and the emitter of said transistor being coupled to ground;
   said collector being capacitively coupled to ground and to the input of said fourth inverter; said fourth inverter having an output coupled to the input of said fifth inverter;
   said second common conductor being coupled to ground.

3. The apparatus of claim 2 wherein the collector of said transistor is coupled by a manually adjustable resistance to said voltage supply.

4. The apparatus of claim 2 including an alarm circuit having first and second inputs; the output of said fourth inverter being coupled to said first input and the output of said fifth inverter being coupled to said second input.

5. A motion detector comprising a plurality of conductive elements in side by side relation, each element being spaced from the adjacent elements and the elements being arranged over a predetermined area; a conductive member being freely movable in two dimensions over said area; said member spanning a distance greater than the spacing between two adjacent elements but less than the spacing between alternate elements to provide successive contact changes comprising contact couplings and contact decouplings between adjacent elements in sequence as the member moves in said area; a first conductor electrically coupled to alternate elements and electrically insulated from the remaining elements; a second conductor electrically coupled to the remaining elements and insulated from said alternate elements; means coupling said first and second conductors for indicating when the number and frequency of said contact changes exceed a predetermined minimum in a given time period; said last means responding to only one of the contact couplings and decouplings.

6. The apparatus of claim 5 wherein said last means is for responding to only the contact decouplings.

7. The apparatus of claim 5 including a first cylindrical housing wall; said area being on the inner peripheral surface of said wall; said elements being interdigitally related; said member being a ball; confining means for confining the movement of said member to said area comprising first and second axially spaced cylinder ends and an inner second cylindrical wall spaced inwardly from said first cylindrical wall a radial distance slightly greater than the diameter of said ball, said space between said cylinder ends being substantially greater than the ball diameter to provide two dimensional movement of said ball over said area; said elements being elongated and parallel to the cylinder axis.

8. The apparatus of claim 5 including a first cylindrical housing wall; said area being on the inner peripheral surface of said wall; said elements being interdigitally related; said member being a ball; confining means for confining the movement of said member to said area comprising first and second axially spaced cylinder ends and an inner second cylindrical wall spaced inwardly from said first cylindrical wall a radial distance slightly greater than the diameter of said ball, said space between said cylinder ends being substantially greater than the ball diameter to provide two dimensional movement of said ball over said area; said elements being elongated and obliquely disposed relative to the cylinder axis.

9. A motion detector comprising;
   a detector housing;
   first means for generating a signal upon a predetermined movement of said housing;
   second means coupled to said first means for processing said signal to provide a first signal upon a predetermined housing movement in a predetermined time period and a second signal upon an absence of housing movement during a predetermined time period;
   third means coupled to said second means for generating an alarm in response to a selectable one of said first and said second signal; and
   fourth means coupled to said second means for adjusting said predetermined time period.

* * * * *